(12) United States Patent
Hoshi et al.

(10) Patent No.: US 9,845,755 B2
(45) Date of Patent: Dec. 19, 2017

(54) COMBUSTION SYSTEM CONTROLLER

(71) Applicant: DENSO CORPORATION, Kariya, Aichi-pref. (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/176,578

(22) Filed: Jun. 8, 2016

(65) Prior Publication Data

US 2016/0363074 A1 Dec. 15, 2016

(30) Foreign Application Priority Data

Jun. 11, 2015 (JP) ................................. 2015-118597

(51) Int. Cl.
| | | |
|---|---|---|
| F02D 41/30 | (2006.01) | |
| F02D 35/02 | (2006.01) | |
| F02D 41/14 | (2006.01) | |
| F02D 19/06 | (2006.01) | |
| F02D 41/00 | (2006.01) | |
| F02M 26/25 | (2016.01) | |

(52) U.S. Cl.
CPC ..... *F02D 41/1454* (2013.01); *F02D 19/0636* (2013.01); *F02D 35/02* (2013.01); *F02D 41/0025* (2013.01); *F02D 41/144* (2013.01); *F02D 35/023* (2013.01); *F02D 35/025* (2013.01); *F02D 35/028* (2013.01); *F02D 2200/06* (2013.01); *F02D 2200/0612* (2013.01); *F02D 2250/38* (2013.01); *F02M 26/25* (2016.02)

(58) Field of Classification Search
CPC ............... F02D 41/3005; F02D 41/123; F02D 41/0025; F02D 41/26; F02D 41/1444; F02D 41/1454; F02D 41/402; F02D 35/02; F02D 35/023; F02D 35/025; F02D 35/028; F02D 2200/0602; F02D 2200/0612; F02D 19/0636; F02D 2250/38; G01N 33/2829; F02B 1/12
See application file for complete search history.

(56) References Cited

U.S. PATENT DOCUMENTS

| | | | | |
|---|---|---|---|---|
| 4,594,979 A | * | 6/1986 | Yasuhara .............. | F02D 41/123 123/357 |
| 5,267,163 A | * | 11/1993 | Yoshida .............. | F02D 41/0025 123/1 A |
| 6,990,956 B2 | * | 1/2006 | Niimi .................. | F02D 19/0628 123/1 A |
| 7,945,373 B2 | * | 5/2011 | Vestrini .............. | F02D 19/0631 701/103 |

(Continued)

FOREIGN PATENT DOCUMENTS

JP 2013-24138 2/2013

*Primary Examiner* — Hieu T Vo
*Assistant Examiner* — Arnold Castro
(74) *Attorney, Agent, or Firm* — Nixon & Vanderhye P.C.

(57) ABSTRACT

A combustion system controller controls an operation of a combustion system including an internal combustion engine. The combustion system controller includes a mixing ratio acquisition portion and a control portion. The mixing ratio acquisition portion acquires the mixing ratios of various components included in a fuel. The control portion controls the operation of the combustion system based on the mixing ratios acquired by the mixing ratio acquisition portion.

8 Claims, 7 Drawing Sheets

(56) References Cited

U.S. PATENT DOCUMENTS

| | | | |
|---|---|---|---|
| 2005/0188948 A1* | 9/2005 | Miura | F02D 41/0002 |
| | | | 123/299 |
| 2006/0118085 A1* | 6/2006 | Oda | F02D 19/081 |
| | | | 123/406.3 |
| 2007/0156322 A1* | 7/2007 | Soga | F02D 41/16 |
| | | | 701/104 |
| 2009/0063005 A1* | 3/2009 | Streib | F02D 35/028 |
| | | | 701/101 |
| 2010/0063708 A1* | 3/2010 | Dotzer | F02D 19/0628 |
| | | | 701/102 |
| 2010/0312459 A1* | 12/2010 | Utsumi | F02D 15/02 |
| | | | 701/106 |
| 2010/0326410 A1* | 12/2010 | Yeh | C10L 1/04 |
| | | | 123/575 |
| 2011/0208408 A1* | 8/2011 | Haskara | F02D 35/023 |
| | | | 701/105 |
| 2013/0289849 A1* | 10/2013 | Uehara | F02B 31/06 |
| | | | 701/103 |
| 2014/0025277 A1* | 1/2014 | Masubuchi | F02D 15/04 |
| | | | 701/104 |
| 2015/0252745 A1* | 9/2015 | Naruse | F02D 35/028 |
| | | | 123/294 |
| 2015/0346180 A1* | 12/2015 | Yamada | F02D 41/28 |
| | | | 701/105 |
| 2016/0097339 A1* | 4/2016 | Naruse | F02D 41/1467 |
| | | | 123/435 |
| 2016/0290250 A1* | 10/2016 | Kurotani | F02D 19/0626 |
| 2016/0363074 A1* | 12/2016 | Hoshi | F02D 41/1454 |
| 2016/0363080 A1* | 12/2016 | Okabayashi | F02D 41/1438 |

* cited by examiner

FIG. 4
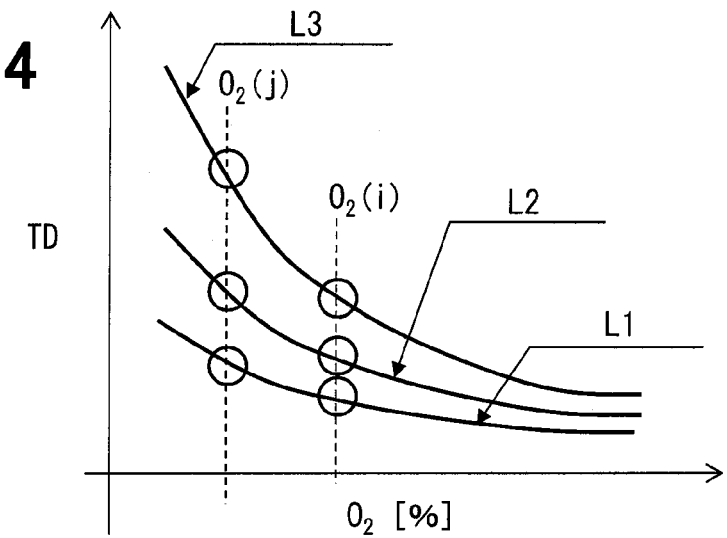
FIG. 5
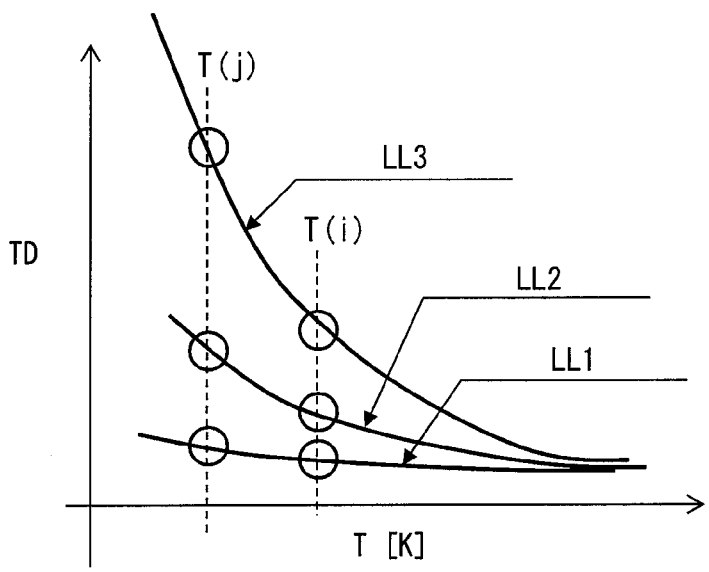
FIG. 6
|    | A     | B     | C     |
|----|-------|-------|-------|
| F1 | LARGE | LARGE | SMALL |
| F2 | SMALL | LARGE | SMALL |
| F3 | LARGE | SMALL | LARGE |

COMBUSTION SYSTEM CONTROLLER

CROSS REFERENCE TO RELATED APPLICATION

This application is based on Japanese Patent Application No. 2015-118597 filed on Jun. 11, 2015, the disclosure of which is incorporated herein by reference.

TECHNICAL FIELD

The present disclosure relates to a combustion system controller which controls an operation of a combustion system.

BACKGROUND

Regarding a fuel used in an internal combustion engine included in a combustion system, the fuel supplied to a user has various characteristics, and an index indicating one of the characteristics is a cetane number that is equivalent to an ignitionability. When the fuel that the cetane number is low is supplied, the ignitionability is deteriorated. Therefore, a control object of the combustion system such as an injection time point of the fuel, an injection amount of the fuel, an injection pressure, and an EGR amount, is changed to be easily ignited.

According to JP2013-24138A, the cetane number is correlative to a fuel density. The fuel density is detected to estimate the cetane number, and the control object is changed according to an estimation result. Therefore, a non-combustion HC, a NOx, and a particulate matter (PM) which are included in an exhaust gas can be reduced, and a fuel consumption can be improved.

SUMMARY

However, it is known that components included in a fuel are different when the fuel differs, and a mixing ratio of each of the components differs when the fuel differs. Therefore, when the cetane numbers are the same and when the components actually included in the fuels are different from each other, the mixing ratios of the components differ. Thus, in a conventional control changing the control object according to the cetane number, there is a limit that the conventional control is optimally executed according to the fuel.

It is an object of the present disclosure to provide a combustion system controller which accurately controls a combustion system at a required state.

According to an aspect of the present disclosure, the combustion system controller controls an operation of a combustion system including an internal combustion engine. The combustion system controller includes a mixing ratio acquisition portion acquiring mixing ratios of various components included in a fuel, and a control portion controlling the operation of the combustion system based on the mixing ratios acquired by the mixing ratio acquisition portion.

According to the present disclosure, the combustion system controller can control the operation of the combustion system according to the mixing ratios of the various components included in the fuel. Comparing with a conventional control using the cetane number, the combustion system controller can accurately control various states such as an emission, an output torque, and a fuel consumption rate, and a balance of the states, in a required state.

BRIEF DESCRIPTION OF THE DRAWINGS

The above and other objects, features and advantages of the present disclosure will become more apparent from the following detailed description made with reference to the accompanying drawings. In the drawings:

FIG. 4 is a diagram showing a relationship between a characteristic line indicating a variation of the ignition delay time generated due to a cylinder oxygen concentration and a molecular structure type of a fuel;

FIG. 5 is a diagram showing a relationship between a characteristic line indicating a variation of the ignition delay time generated due to a cylinder temperature and the molecular structure type of the fuel;

FIG. 6 is a diagram showing a relationship between the characteristic line specified based on the ignition delay time and a mixing ratio of the molecular structure type;

DESCRIPTION OF EMBODIMENTS

Figure 1:
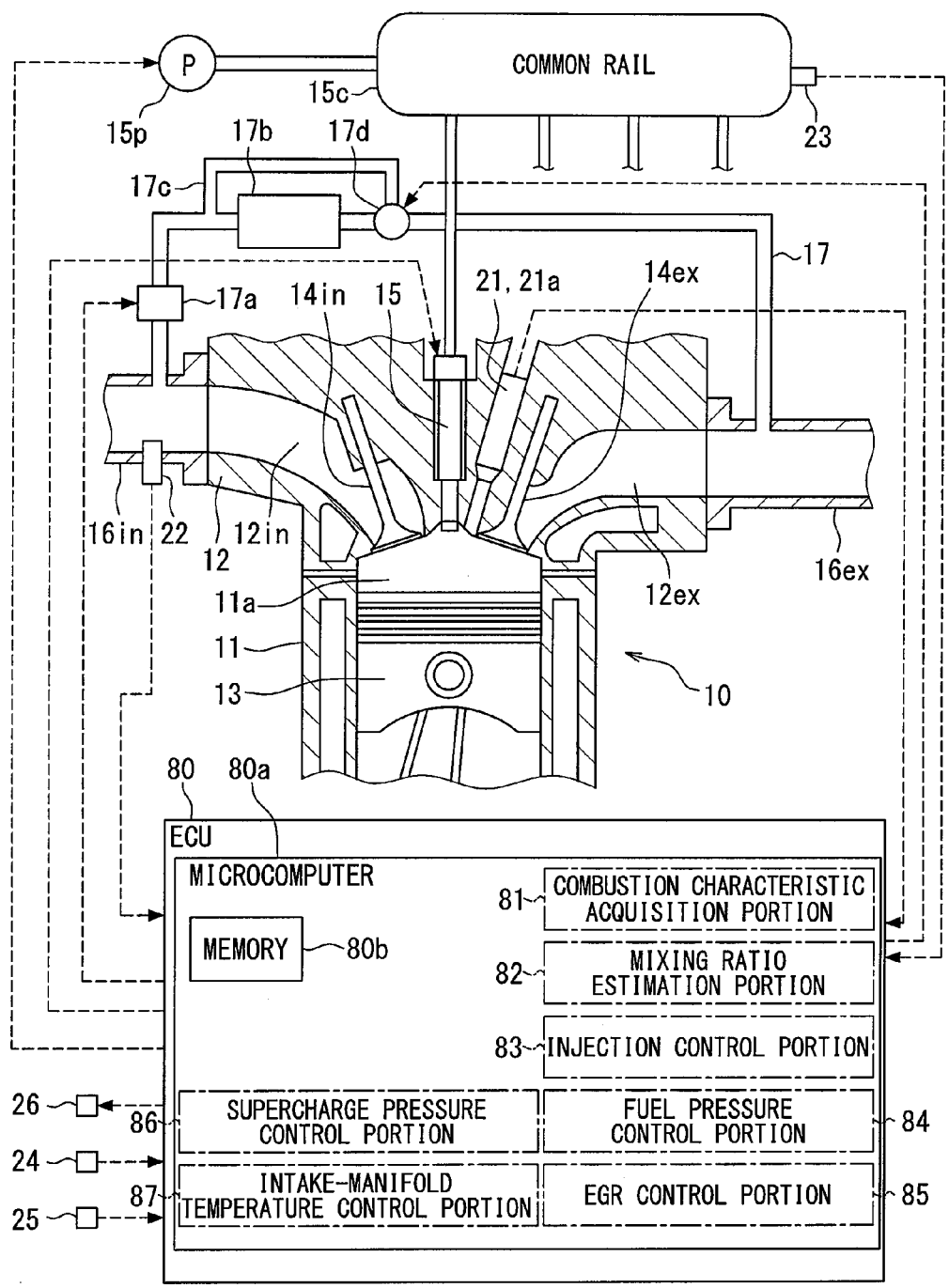
FIG. 1 is a diagram showing a combustion system controller according to a first embodiment of the present disclosure, and a combustion system of an internal combustion engine to which the combustion system controller is applied.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration in each embodiment is changed, the other parts of the configuration can be configured as the same as a prior embodiment.

(First Embodiment)

According to a first embodiment of the present disclosure, a combustion system controller is constituted based on an electric control unit (ECU) 80 shown in FIG. 1. The ECU 80 includes a microcomputer 80*a*, an input processing circuit that is not shown, and an output processing circuit that is not shown. The microcomputer 80*a* includes a central processing unit (CPU) that is not shown and a memory 80*b*. Since the CPU executes a specified program stored in the memory 80*b*, the microcomputer 80*a* controls operations of a fuel injector 15, a fuel pump 15*p*, an exhaust gas recirculation (EGR) valve 17a, a temperature regulating valve 17d, and a supercharge pressure-regulating apparatus 26 which are included in the combustion system. A combustion state in an internal combustion engine 10 included in the combustion system is controlled in a required state by the above controls. The combustion system and the ECU 80 are mounted to a vehicle, and the vehicle travels by using an output of the internal combustion engine 10 as a driving source.

The internal combustion engine 10 includes a cylinder block 11, a cylinder head 12, and a piston 13. The cylinder head 12 is provided with an intake valve 14in, an exhaust valve 14ex, the fuel injector 15, and a cylinder pressure sensor 21.

The fuel pump 15p presses and feeds a fuel in a fuel tank to a common rail 15c. Since the ECU 80 controls the operation of the fuel pump 15p, the fuel is accumulated in the common rail 15c in a state where a pressure of the fuel is maintained to be a target pressure Ptrg. The common rail 15c distributes the fuel that is accumulated to the fuel injector 15 in each cylinder. The fuel injected from the fuel injector 15 is mixed with an intake gas to be a mixing gas in a combustion chamber 11a. The mixing gas is compressed by the piston 13 to be self-ignited. The internal combustion engine 10 is a diesel engine of a compression self-ignition type, and a light oil is used as the fuel.

The fuel injector 15 includes a body receiving an electromagnetic actuator and a valve member. When the ECU 80 controls to turn on the electromagnetic actuator, a leakage passage of a back-pressure chamber that is not shown is opened according to an electromagnetic attractive force, the valve member is opened according to a decreasing of a back pressure, an injection port arranged in the body is opened, and the fuel is injected from the injection port. When the ECU 80 controls to turn off the electromagnetic actuator, the valve member is closed, and a fuel injection is stopped.

An intake port 12in and an exhaust port 12ex which are arranged in the cylinder head 12 are connected with an intake pipe 16in and an exhaust pipe 16ex, respectively. The intake pipe 16in and the exhaust pipe 16ex are connected with an EGR pipe 17, and a part of an exhaust gas which is an EGR gas is introduced (returned) into the intake pipe 16in through the EGR pipe 17. The EGR pipe 17 is provided with the EGR valve 17a. Since the ECU 80 controls the operation of the EGR valve 17a, an opening degree of the EGR pipe 17 is controlled, and a flow rate of the EGR gas is controlled.

An EGR cooler 17b which cools down the EGR gas, a bypass pipe 17c, and the temperature regulating valve 17d are arranged at positions in the EGR pipe 17 upstream of the EGR valve 17a. The bypass pipe 17c defines a bypass passage through which the EGR gas bypasses the EGR cooler 17b. Since the temperature regulating valve 17d adjusts an opening degree of the bypass passage, the temperature regulating valve 17d adjusts a ratio of the EGR gas flowing through the EGR cooler 17b relative to the EGR gas flowing through the bypass passage, and adjusts a temperature of the EGR gas flowing into the intake pipe 16in. In this case, the intake gas flowing into the intake port 12in includes an exterior air (fresh air) flowing from the intake pipe 16in and the EGR gas. Therefore, when the temperature regulating valve 17d adjusts the temperature of the EGR gas, the temperature regulating valve 17d also adjusts a temperature of the intake gas flowing into the intake port 12in. In this case, the temperature of the intake gas flowing into the intake port 12in is referred to as an intake manifold temperature.

The combustion system includes a supercharger that is not shown. The supercharger includes a turbine that is mounted to the exhaust pipe 16ex, and a compressor that is mounted to the intake pipe 16in. When the turbine rotates according to a flow-rate energy of the exhaust gas, the compressor rotates by a rotational force of the turbine, and the fresh air is compressed (supercharged) by the compressor. The supercharge pressure-regulating apparatus 26 is an apparatus that changes a capacity of the turbine. Since the ECU 80 controls the operation of the supercharge pressure-regulating apparatus 26, the capacity of the turbine is adjusted, and a supercharge pressure is controlled by the compressor.

The ECU 80 receives detection signals from various sensors including the cylinder pressure sensor 21, an oxygen concentration sensor 22, a common-rail pressure sensor 23, a crank angle sensor 24, and an accelerator pedal sensor 25.

The cylinder pressure sensor 21 outputs the detection signal depending on a cylinder pressure that is a pressure in the combustion chamber 11a. The cylinder pressure sensor 21 includes a temperature detection element 21a besides a pressure detection element. The cylinder pressure sensor 21 outputs the detection signal depending on a cylinder temperature that is a temperature in the combustion chamber 11a. The oxygen concentration sensor 22 is mounted to the intake pipe 16in, and outputs the detection signal depending on a concentration of an oxygen in the intake gas. The intake gas that is a detection target includes the fresh air and the EGR gas. The common-rail pressure sensor 23 is mounted to the common rail 15c, and outputs the detection signal depending on a pressure of the fuel accumulated in the common rail 15c. In this case, the pressure of the fuel accumulated in the common rail 15c is referred to as a common-rail pressure. The crank angle sensor 24 outputs the detection signal depending on a rotational speed of a crank shaft that is rotatably driven by the piston 13. In this case, the rotational speed is equivalent to an engine speed. The accelerator pedal sensor 25 outputs the detection signal depending on a pressing position of an accelerator pedal which is operated by a driver of the vehicle. In this case, the pressing position of the accelerator pedal is equivalent to an engine load.

The ECU 80 controls the operations of the fuel injector 15, the fuel pump 15p, the EGR valve 17a, the temperature regulating valve 17d, and the supercharge pressure-regulating apparatus 26, based on the detection signals. Therefore, the ECU 80 controls an injection start time point of the fuel, an injection amount of the fuel, an injection pressure of the fuel, an flowing amount of the EGR gas, the intake manifold temperature, and the supercharge pressure.

The microcomputer 80a of when controlling the operation of the fuel injector 15 functions as an injection control portion 83 to control the injection start time point of the fuel, the injection amount of fuel, and an injection number of a multiple injection. The microcomputer 80a of when controlling the operation of the fuel pump 15p functions as a fuel pressure control portion 84 to control the injection pressure. The microcomputer 80a of when controlling the operation of the EGR valve 17a functions as an EGR control portion 85 to control the flowing amount of the EGR gas. The microcomputer 80a of when controlling the operation of the temperature regulating valve 17d functions as an intake-manifold temperature control portion 87 to control the intake manifold temperature. The microcomputer 80a of when controlling the operation of the supercharge pressure-regulating apparatus 26 functions as a supercharge pressure control portion 86 to control the supercharge pressure.

Figure 2:
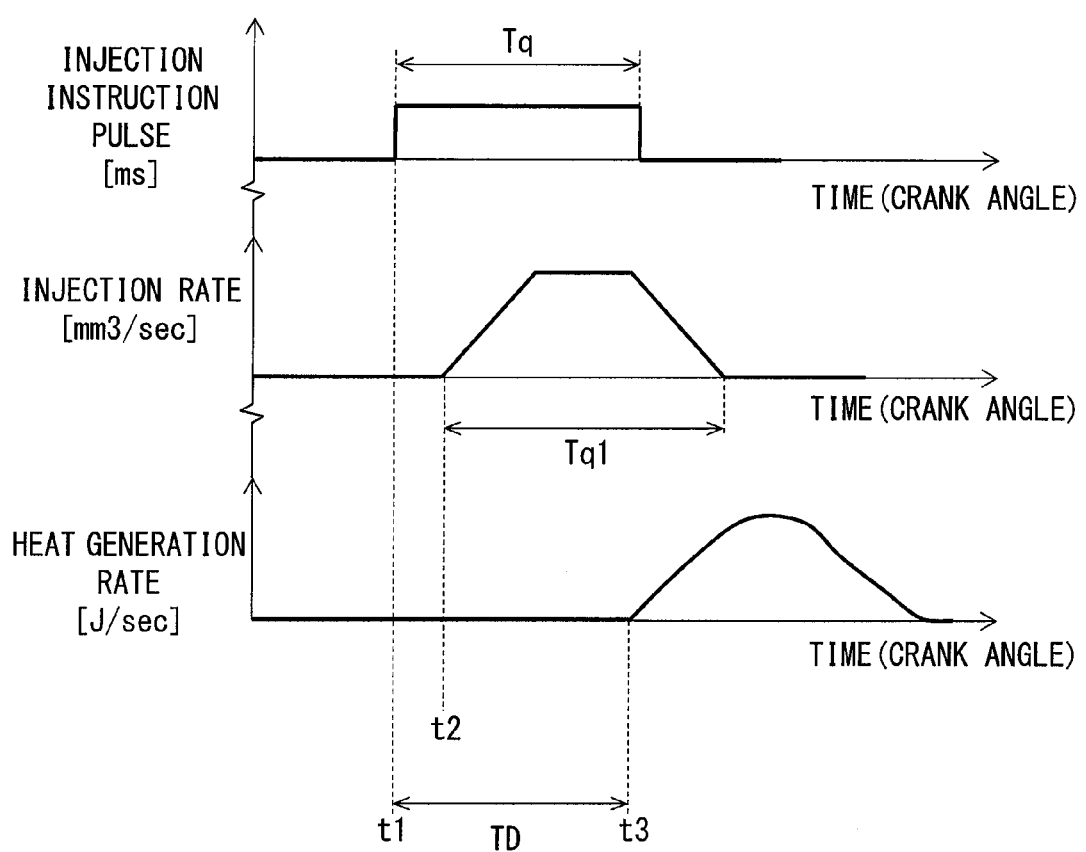
FIG. 2 is a diagram showing an ignition delay time.

The microcomputer 80a also functions as a combustion characteristic acquisition portion 81 to acquire a detection value of a physical amount relating to the combustion. In this case, the detection value of the physical amount relating to the combustion is equivalent to a combustion characteristic value. According to the present embodiment, the combustion characteristic value is the ignition delay time TD shown in FIG. 2. As shown in FIG. 2, an injection instruction pulse indicates a pulse signal that is outputted from the microcomputer 80a. An energization of the fuel injector 15 is controlled according to the pulse signal. Specifically, the energization starts at a time point t1 that the injection instruction pulse is turned on, and continues in a pulse on period Tq. In other words, a timing that the injection instruction pulse is turned on controls the injection start time point. Further, the pulse on period T controls an injection time period of the fuel, and then controls the injection amount.

As shown in FIG. 2, an injection rate indicating an injection state of the fuel which is generated by a valve-opening operation and a valve-closing operation that are executed according to the pulse signal is relative to the injection amount. Specifically, an injection rate indicates the injection amount of the fuel injected per unit time. As shown in FIG. 2, a time delay exists between the time point t1 that the energization starts and a time point t2 that the injection is actually started. Further, a time delay exists between an energization complete time point and a time point that the injection is actually stopped. The pulse on period Tq controls an actual injection period Tq1.

As shown in FIG. 2, a heat generation rate indicates the combustion state of the fuel injected in the combustion chamber 11a. Specifically, the heat generation rate indicates a heat amount where the mixing gas including the fuel and the intake gas is self-ignited per unit time. As shown in FIG. 2, a time delay exists between the time point t2 that the injection is actually started and a time point t3 that the combustion is actually started. According to the present embodiment, a time period from the time point t1 to the time point t3 is referred to as the ignition delay time TD.

The combustion characteristic acquisition portion 81 estimates the time point t3, based on a variation of the cylinder pressure detected by the cylinder pressure sensor 21. Specifically, in a time period from a time point that the piston 13 reaches a top dead center to a time point that a crank angle rotates by a predetermined value, the combustion characteristic acquisition portion 81 estimates a time point that the cylinder pressure rapidly increases as the combustion start time point that is the time point t3. The combustion characteristic acquisition portion 81 calculates the ignition delay time TD based on an estimation result. Further, the combustion characteristic acquisition portion 81 acquires various states in the combustion every time the combustion occurs. In this case, various states include combustion conditions. Specifically, the combustion characteristic acquisition portion 81 acquires the cylinder pressure, the cylinder temperature, an intake-gas oxygen concentration, and the injection pressure, as the combustion conditions. In this case, the intake-gas oxygen concentration is the concentration of the oxygen in the intake gas.

The combustion conditions are equivalent to combustion parameters indicating easiness levels of the combustions. When the cylinder pressure right before the combustion occurs is higher and when the cylinder temperature right before the combustion occurs is higher and when intake-gas oxygen concentration is higher and when the injection pressure is higher, the mixing gas becomes more easily self-ignited. The cylinder pressure and the cylinder temperature which are detected at the time point t1 that the energization of the fuel injector 15 starts may be used as the cylinder pressure right before the combustion occurs and the cylinder temperature right before the combustion occurs, respectively. The cylinder pressure is detected by the cylinder pressure sensor 21, the cylinder temperature is detected by the temperature detection element 21a, the intake-gas oxygen concentration is detected by the oxygen concentration sensor 22, and the injection pressure is detected by the common-rail pressure sensor 23. The combustion characteristic acquisition portion 81 stores the ignition delay time TD in association with the combustion conditions correlative to the combustion used to estimate the ignition delay time, in the memory 80b.

The microcomputer 80a also functions as a mixing ratio estimation portion 82 to estimate mixing ratios of various components included in the fuel, based on plural combustion characteristics detected in different combustion conditions. For example, the microcomputer 80a calculates mixing amounts of various components by substituting the ignition delay times TD in different combustion conditions for those in an equation shown in FIG. 3. The microcomputer 80a calculates the mixing ratios of various components by dividing a total sum of the mixing amounts by each of the mixing amounts.

Figure 3:
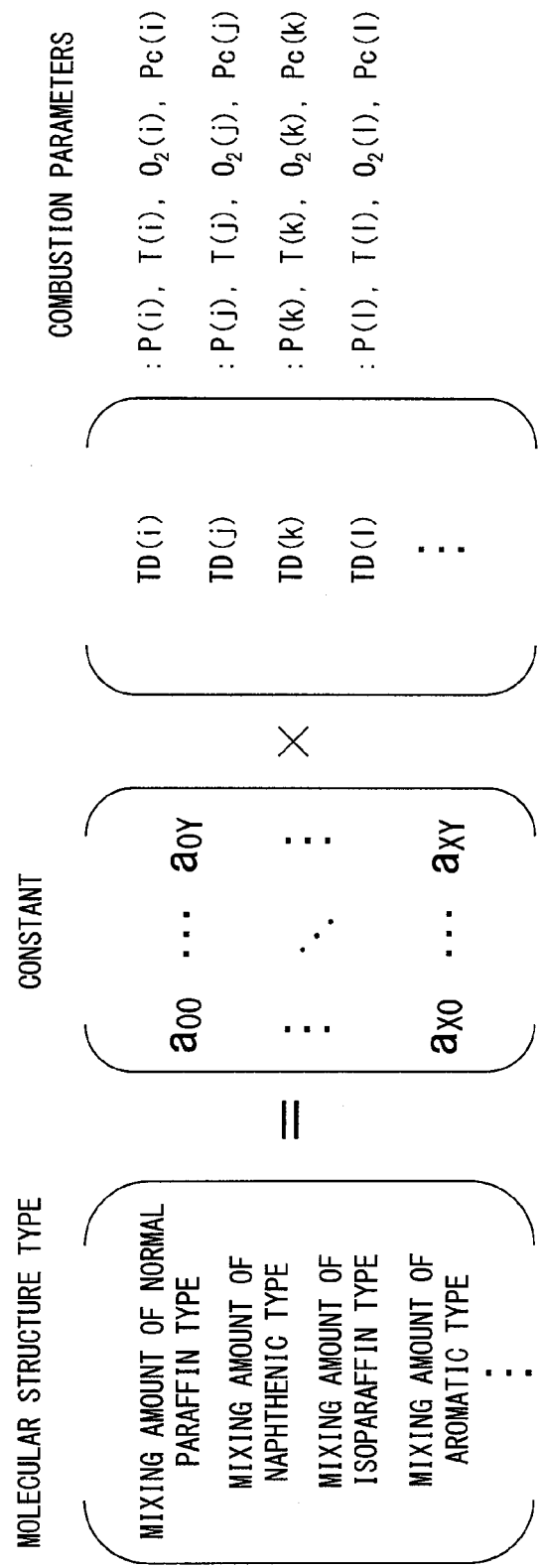
FIG. 3 is a diagram showing a relationship between plural ignition delay times, combustion parameters indicating easiness levels of combustions, and mixing mounts of various components.

As shown in FIG. 3, a molecular structure type is constituted by values arranged in a matrix including x+1 rows and 1 column. The values indicate the mixing amounts of various components. The various components are components divided by types of a molecular structure. The types of the molecular structure include a normal paraffin type, an isoparaffin type, a naphthenic type, and an aromatic type.

As shown in FIG. 3, a constant is constituted by values arranged in a matrix including x+1 rows and y+1 columns. The values are constants established based on a pretest. As shown in FIG. 3, the combustion parameters are constituted by values arranged in a matrix including y+1 rows and 1 column. The values are the ignition delay time TD acquired by the combustion characteristic acquisition portion 81. For example, the value arranged at 1st row and 1st column is the ignition delay time TD(i) that is acquired in a combustion condition i that is a specified combination of the parameters, and the value arranged at 2nd row and 1st column is the ignition delay time TD(j) that is acquired in a combustion condition j. The combustion condition i and the combustion condition j are set based on values different in all of the parameters. Further, as shown in FIG. 3, $P(i)$, $T(i)$, $O_2(i)$, $Pc(i)$ indicate the cylinder pressure, the cylinder temperature, the intake-gas oxygen concentration, and the injection pressure which are correlative to the combustion condition i, respectively. Similarly, $P(j)$, $T(j)$, $O_2(j)$, $Pc(j)$ indicate the cylinder pressure, the cylinder temperature, the intake-gas oxygen concentration, and the injection pressure which are correlative to the combustion condition j, respectively.

Hereafter, referring FIGS. 4 to 6, a calculation of the molecular structure type will be described.

As shown in FIG. 4, since the mixing gas becomes more easily self-ignited when the cylinder oxygen concentration that is the concentration of the oxygen included in the mixing gas in the combustion becomes higher, the ignition delay time TD becomes shorter. Solid lines L1, L2, and L3 are characteristic lines indicating relationships between the cylinder oxygen concentrations and the ignition delay times TD. The characteristic lines are different according to the fuel. Specifically, the characteristic lines are different according to the mixing ratios of the molecular structure types included in the fuel. Therefore, when the combustion characteristic acquisition portion 81 detects the ignition delay time TD of when the cylinder oxygen concentration is $O_2(i)$, the combustion characteristic acquisition portion 81 can estimate one of the molecular structure types. When the combustion characteristic acquisition portion 81 compares the ignition delay time TD of when the cylinder oxygen concentration is $O_2(i)$ with the ignition delay time TD of when the cylinder oxygen concentration is $O_2(j)$, the combustion characteristic acquisition portion 81 can estimate the mixing ratio with a higher accuracy. As shown in FIG. 4, the solid line L1 is the characteristic line obtained according to a fuel F1, the solid line L2 is the characteristic line obtained according to a fuel F2, and the solid line L3 is the characteristic line obtained according to a fuel F3.

Similarly, as shown in FIG. 5, since the mixing gas becomes more easily self-ignited when the cylinder temperature becomes higher, the ignition delay time TD becomes shorter. Solid lines LL1, LL2, and LL3 are characteristic lines indicating relationships between the cylinder temperatures and the ignition delay times TD. The characteristic lines are different according to the fuel. Specifically, the characteristic lines are different according to the mixing ratios of the molecular structure types included in the fuel. Therefore, when the combustion characteristic acquisition portion 81 detects the ignition delay time TD of when the cylinder temperature is T(i), the combustion characteristic acquisition portion 81 can estimate one of the molecular structure types. When the combustion characteristic acquisition portion 81 compares the ignition delay time TD of when the cylinder temperature is T(i) with the ignition delay time TD of when the cylinder temperature is T(j), the combustion characteristic acquisition portion 81 can estimate the mixing ratio with a higher accuracy. As shown in FIG. 5, the solid line LL1 is the characteristic line obtained according to the fuel F1, the solid line LL2 is the characteristic line obtained according to the fuel F2, and the solid line LL3 is the characteristic line obtained according to the fuel F3.

The molecular structure type highly affecting the characteristic line correlative to the cylinder oxygen concentration as shown in FIG. 4 is different from the molecular structure type highly affecting the characteristic line correlative to the cylinder temperature as shown in FIG. 5. As the above description, the molecular structure types highly affecting the characteristic lines are different in plural combustion conditions which are correlative to the characteristic line. Therefore, the combustion characteristic acquisition portion 81 can estimate the mixing ratio of the molecular structure type which is large or small as shown in FIG. 6, based on combinations of the ignition delay times TD acquired in different parameters (different combustion conditions).

As shown in FIG. 6, a molecular structure type A is the molecular structure type highly affecting the characteristic line correlative to the cylinder oxygen concentration. In this case, the characteristic line is referred to as a first characteristic line, and the cylinder oxygen concentration is referred to as a first parameter. Further, a molecular structure type B is the molecular structure type highly affecting the characteristic line correlative to the cylinder temperature. In this case, the characteristic line is referred to as a second characteristic line, and the cylinder temperature is referred to as a second parameter. Furthermore, a molecular structure type C is the molecular structure type highly affecting the characteristic line correlative to a third parameter. In this case, the characteristic line is referred to as a third characteristic line. When a variation of the ignition delay time TD becomes larger relative to a variation of the first parameter, the mixing of the molecular structure type A included in the mixing gas becomes higher. Similarly, when the variation of the ignition delay time TD becomes larger relative to a variation of the second parameter, the mixing of the molecular structure type B included in the mixing gas becomes higher. Further, when the variation of the ignition delay time TD becomes larger relative to a variation of the third parameter, the mixing of the molecular structure type C included in the mixing gas becomes higher. Thus, the combustion characteristic acquisition portion 81 can estimate the mixing ratio of the molecular structure type A, the molecular structure type B, and the molecular structure type C, relative to the fuel F1, the fuel F2, and the fuel F3, respectively.

Next, an operation of a program executed by the combustion characteristic acquisition portion 81 will be described. The operation is executed every time that a pilot injection is instructed. In one combustion cycle, it is possible that an injection control executes the multiple injection where the same fuel injector 15 is controlled to inject the fuel for plural times. In the multiple injection, an injection that injects the injection amount with a maximum value is referred to as a main injection, and an injection executed right before the main injection is referred to as the pilot injection.

First, the combustion characteristic acquisition portion 81 estimates the time point t3 that is the combustion start time point based on a detection value of the cylinder pressure sensor 21, and calculates the ignition delay time TD correlative to the pilot injection. Next, the combustion characteristic acquisition portion 81 stores the ignition delay time TD in association with the combustion conditions that are plural parameters, in the memory 80b.

Specifically, a value range where the parameters can be obtained is previously divided into plural regions, and combinations of regions of plural parameters are previously established. As shown in FIG. 3, the ignition delay time TD(i) indicates the ignition delay time TD acquired in a case where regions of P(i), T(i), $O_2(i)$, and Pc(i) are combined. Similarly, the ignition delay time TD(j) indicates the ignition delay time TD acquired in a case where regions of P(j), T(j), $O_2(j)$, and Pc(j) are combined.

When it is highly possible that the fuel stored in the fuel tank is mixed with other fuel in a case where a user supplies a fuel into the fuel tank, the mixing ratios of the molecular structure types change, and the microcomputer 80a resets values of the mixing amounts which are estimated. For example, when an increasing of a fuel surplus amount is detected by a sensor detecting the fuel surplus amount in the fuel tank in a case where the internal combustion engine 10 is stopped, the combustion characteristic acquisition portion 81 resets the values of the mixing amounts which are estimated.

The combustion characteristic acquisition portion 81 calculates the mixing amount of each of the molecular structure types, by substituting the ignition delay times TD for those in the equation shown in FIG. 3. The combustion characteristic acquisition portion 81 changes a row number of the constant according to a sampling number that is a row number of the combustion parameters. Alternatively, when the ignition delay time TD is not acquired, the combustion characteristic acquisition portion 81 substitutes nominal values for the ignition delay times TD in the equation shown in FIG. 3. The combustion characteristic acquisition portion 81 calculates the mixing ratio of each of the molecular structure types, based on the mixing amount of each of the molecular structure types which is calculated.

The microcomputer 80a functions as the injection control portion 83, the fuel pressure control portion 84, the EGR control portion 85, the supercharge pressure control portion 86, and the intake-manifold temperature control portion 87. The above control portions set target values based on the engine speed, the engine load, and an engine-coolant temperature, and feedback control control objects to be the target values. Alternatively, the above control portions open control at a condition corresponding to the target values.

The injection control portion 83 controls the injection start time point, the injection amount, and the injection number, by setting the pulse signal shown in FIG. 2, so as to control the injection start time point, the injection amount, and the injection number to be target values. In this case, the injection control portion 83 executes the injection control. The injection number is the injection number of the multiple injection. Specifically, the injection control portion 83 previously stores an energization time and an energization start time point that are correlative to the target values, in a map. In this case, the energization time is a time period where the pulse signal is continuously turned on, and the energization start time point is a time point that the pulse signal rises. The injection control portion 83 acquires the energization time and the energization start time point that are correlative to the target values from the map, and sets the pulse signal.

The injection control portion 83 stores an output torque obtained by the injection or an emission state value including a NOx amount and a PM amount. In an injection after a present injection, when the injection control portion 83 sets the target values based on the engine speed and the engine load, the injection control portion 83 corrects the targets based on the above values that are stored. In other words, the injection control portion 83 feedback controls and corrects the target values such that a difference between an actual output torque and a request output torque and a difference between an actual emission state value and a request emission state value become zero.

The fuel pressure control portion 84 controls an operation of a regulating valve that controls a flow rate of the fuel suctioned in the fuel pump 15$p$. Specifically, the fuel pressure control portion 84 feedback controls the operation of the regulating valve, based on a difference between an actual common-rail pressure detected by the common-rail pressure sensor 23 and the target pressure Ptrg that is a target value. Then, the fuel pressure control portion 84 controls a discharge amount of the fuel pump 15$p$ per unit time, and controls the actual common-rail pressure to be the target value. In this case, the fuel pressure control portion 84 executes a fuel pressure control.

The EGR control portion 85 sets the target value of the EGR amount, based on the engine speed and the engine load. The EGR control portion 85 controls a valve opening degree of the EGR valve 17$a$ based on the target value to control the EGR amount. In this case, the EGR control portion 85 executes an EGR control. The supercharge pressure control portion 86 sets the target value of the supercharge pressure, based on the engine speed and the engine load. The supercharge pressure control portion 86 controls the operation of the supercharge pressure-regulating apparatus 26 based on the target value to control the discharge pressure. In this case, the supercharge pressure control portion 86 executes a supercharge-pressure control. The intake-manifold temperature control portion 87 sets the target value of the intake manifold temperature, based on an ambient temperature, the engine speed, and the engine load. The intake-manifold temperature control portion 87 controls a valve opening degree of the temperature regulating valve 17$d$ based on the target value to control the intake manifold temperature. In this case, the intake-manifold temperature control portion 87 executes an intake-manifold temperature control.

Figure 7:
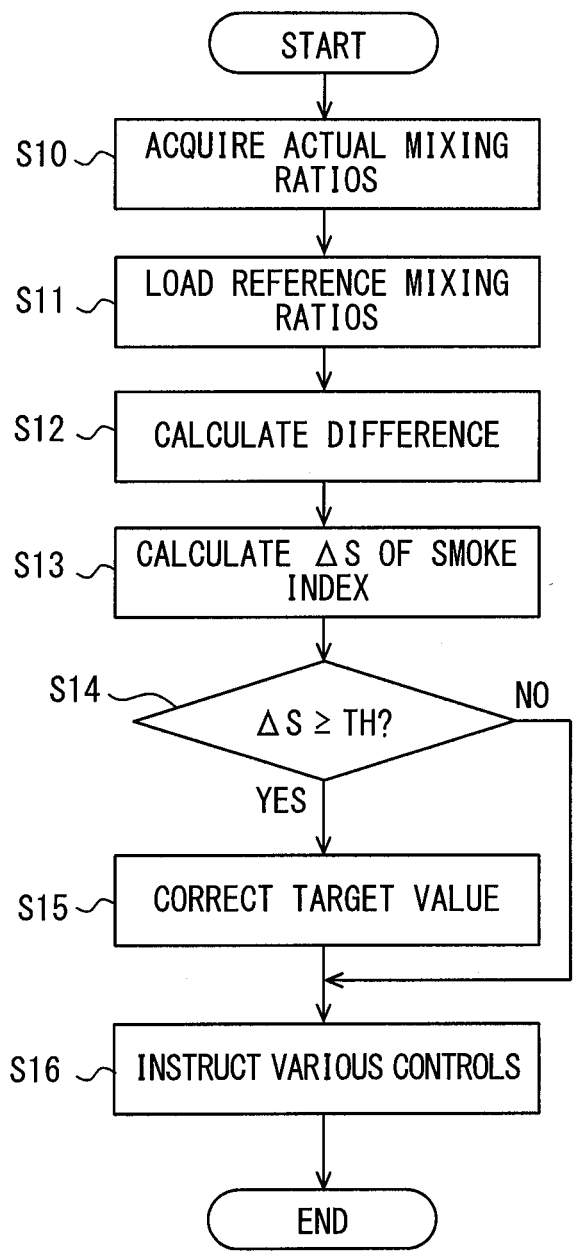
FIG. 7 is a flowchart showing a processing flow of a microcomputer which is a control flow of an operation of a combustion system.

Further, the target values set by the above control portions are corrected by the mixing ratios estimated by the mixing ratio estimation portion 82. Referring to FIG. 7, a control flow of the above correction executed by the microcomputer 80$a$ will be described. The above control flow is repeatedly executed at a predetermined period, in an operation time period of the internal combustion engine 10.

At S10, the microcomputer 80$a$ acquires actual mixing ratios that are the mixing ratios estimated by the mixing ratio estimation portion 82. The microcomputer 80$a$ executing S10 is equivalent to a mixing ratio acquisition portion. In other words, the microcomputer 80$a$ acquires the mixing ratios of the molecular structure type shown in FIG. 3. Reference mixing ratios that are reference values of the mixing ratios relative to the molecular structure type are previously established and are stored in the memory 80$b$. The reference mixing ratios are established by considering the fuel used in countries or regions where the vehicle is used. At S11, the microcomputer 80$a$ loads the reference mixing ratios from the memory 80$b$. At S12, the microcomputer 80$a$ calculates a difference between the actual mixing ratio acquired at S10 and the reference mixing ratio loaded at S11, for each of the molecular structure types.

When fuel characteristics such as cetane numbers are the same and when the mixing ratios of various components included in the fuels are different from each other, an easiness level of a generation of a smoke according to the fuel differs. In this case, the easiness level of the generation of the smoke is referred to as a generation level of the smoke. According to the present embodiment, an index indicating the generation level of the smoke is referred to as a smoke index. When the smoke index increases, the generation level of the smoke increases. The various components include a component highly affecting the smoke index and a component hardly affecting the smoke index. Considering the above affecting levels, the smoke index is calculated based on the mixing ratios of the various components. The smoke index correlative to the fuel where the mixing ratios of the various components become the reference mixing ratios is referred to as a reference smoke index.

At S13, the microcomputer 80$a$ calculates a difference $\Delta S$ of the smoke index, based on the difference calculated at S12. The difference $\Delta S$ is a difference between the smoke index calculated from the actual mixing ratios and the reference smoke index. The microcomputer 80$a$ calculating the difference $\Delta S$ of the smoke index at S13 is equivalent to an emission estimation portion that estimates the generation level of the smoke that is a specified component included in the exhaust gas based on the mixing ratios.

At S14, the microcomputer 80$a$ determines whether the difference $\Delta S$ calculated at S13 is greater than or equal to a threshold TH. When the microcomputer 80$a$ determines that the difference $\Delta S$ is greater than or equal to the threshold TH, the microcomputer 80$a$ proceeds to S15. At S15, the microcomputer 80$a$ corrects at least one of the target values set by the above control portions including the injection control portion 83, based on the difference $\Delta S$.

Specifically, when the microcomputer 80$a$ determines that the difference $\Delta S$ is greater than or equal to the threshold TH, the microcomputer 80$a$ corrects the target values as followings to reduce the smoke. The microcomputer 80$a$ increases the target pressure Ptrg and increases the injection pressure of the fuel. The microcomputer 80$a$ decreases the target value of the EGR amount and decreases an actual EGR amount. The microcomputer 80$a$ increases the target value of the supercharge pressure and increases an actual supercharge pressure. The microcomputer 80a decreases the target value of the intake manifold temperature and decreases an actual intake manifold temperature. The microcomputer 80a decreases a target injection amount of the pilot injection and advances a target injection start time point of the pilot injection. The microcomputer 80a corrects at least one of the above target values, based on the actual mixing ratios of the various components. Further, the microcomputer 80a determines a correction level of the above target values based on the actual mixing ratios of the various components. Specifically, the microcomputer 80a determines a value by which one target value is corrected.

At S16, the microcomputer 80a instructs the above various controls including the injection control, based on the target values. The microcomputer 80a executing S15 and S16 is equivalent to a control portion that controls an operation of the combustion system based on the mixing ratios acquired by the mixing ratio acquisition portion.

FIG. 7 is a flowchart showing a control correcting the target values by considering the smoke. Similarly, considering other emissions including a NOx or a PM, the target values can be corrected based on the mixing ratios. Further, considering the output torque or a fuel consumption rate, the target values can be corrected based on the mixing ratios.

As the above description, according to the present embodiment, the combustion system controller includes the mixing ratio estimation portion 82 that acquires the mixing ratios of the various components included in the fuel, and the control portion that controls the operation of the combustion system based on the mixing ratios that are acquired. The control portion includes the injection control portion 83, the fuel pressure control portion 84, the EGR control portion 85, the supercharge pressure control portion 86, and the intake-manifold temperature control portion 87.

When the fuel characteristics such as cetane numbers are the same and when the mixing ratios of various components included in the fuels are different from each other, an optimal control controlling the combustion system in a required state differs. For example, the various components include a smoke factor component that is a component highly affecting an amount of the generation of the smoke, a component highly affecting an amount of a generation of the NOx, and a component highly affecting an amount of a generation of a heat. In this case, the amount of the generation of the smoke is referred to as a smoke generation amount, the amount of the generation of the NOx is referred to as a NOx generation amount, and the amount of the generation of the heat is referred to as a heat generation amount.

According to the present embodiment, the microcomputer 80a corrects the target values correlative to the injection control, the fuel-pressure control, the EGR control, the supercharge-pressure control, and the intake-manifold temperature control, based on the mixing ratio of the smoke factor component so as to control the smoke generation amount to be less than an upper limit. Similarly, the microcomputer 80a corrects other target values based on other factor components. As the above description, according to the present embodiment, the combustion system is controlled according to the mixing ratios of the various components included in the fuel. Comparing with a conventional control using the cetane number, the above control can accurately control various states such as the emission, the output torque, and the fuel consumption rate, and a balance of the states, in the required state.

According to the present embodiment, the component that is an estimation object of the mixing ratio is a component that is divided by types of the molecular structure. When the fuel characteristics such as cetane numbers are the same and when the mixing ratios of various components included in the fuels are different from each other, the characteristic line of the ignition delay time TD (combustion characteristic value) shown in FIGS. 4 and 5 differs. According to the present embodiment that the mixing ratios are considered in the injection control, comparing with a configuration that the cetane number or a fuel density is considered, the emission, the combustion state, and the injection state can be accurately achieved in the required state.

According to the present embodiment, the types of the molecular structure include at least one of a normal paraffin type, an isoparaffin type, a naphthenic type, or an aromatic type. In other words, the types of the molecular structure include one or more of the normal paraffin type, the isoparaffin type, the naphthenic type, and the aromatic type. Since the above types of the molecular structure highly affect the combustion state, an estimation of the mixing ratios of the components divided according to the above types is used to consider the mixing ratios in the controls correlative to the combustion.

According to the present embodiment, the combustion system controller includes the emission estimation portion that estimates the generation level of a specified component included in the exhaust gas of the internal combustion engine 10, based on the mixing ratios. Specifically, the emission estimation portion calculates the difference ΔS of the smoke index at S13. The control portion including the injection control portion 83 controls the fuel injector 15 based on the estimation result of the emission estimation portion so as to control the operation of the combustion system.

When the fuel characteristics such as cetane numbers are the same and when the mixing ratios of various components are different from each other, the emission state of the smoke differs. Therefore, when the cetane number of the fuel that is used is acquired, the emission state cannot be estimated. However, the emission state including the smoke generation amount can be estimated based on the mixing ratios of the various components included in the fuel. According to the present embodiment, the generation level of the specified component included in the exhaust gas is estimated based on the mixing ratios, and the operation of the combustion system is controlled based on the estimation result. Therefore, it can be accurately achieved that the emission state is controlled in the required state.

According to the present embodiment, the combustion system controlled includes the combustion characteristic acquisition portion 81 and the mixing ratio estimation portion 82. The combustion characteristic acquisition portion 81 acquires the detection value of the physical amount relating to the combustion of the internal combustion engine 10, as the combustion characteristic. The mixing ratio estimation portion 82 estimates the mixing ratios of the various components included in the fuel, based on plural combustion characteristics detected in different combustion conditions.

When fuels used in the combustion are the same and when the combustion conditions such as the cylinder pressures or the cylinder temperatures are different from each other, the combustion characteristic values such as the ignition delay times or the heat generation amounts differ. For example, as shown in FIG. 4, regarding the fuel F1, the combustion characteristic value that is the ignition delay time TD decreases in accordance with the combustion condition where the cylinder oxygen concentration increases. The solid lines as shown in FIG. 4 which are characteristic lines indicating levels of variations of the combustion characteristic values relative to variations of the combustion conditions differ in the fuels F1, F2, and F3 that are different from each other in the mixing ratios of the molecular structure types. According to the present embodiment, since the microcomputer 80a estimates the mixing ratios of the molecular structure types included in the fuel based on the combustion characteristic values that are the ignition delay times TD detected in different combustion conditions, the microcomputer 80a can further accurately acquire the fuel characteristic that is a characteristic of the fuel.

According to the present embodiment, the combustion condition is a condition specified by a combination of parameters of plural types. In other words, the microcomputer 80a acquires the combustion characteristic value in the combustion where the value of the parameter differs, for each of the parameters. Thus, the microcomputer 80a acquires the combustion characteristic value in the combustion where the value of the parameter differs for the parameter of the same type, and the microcomputer 80a can more accurately estimate the mixing ratios than that in a configuration where the mixing ratios are estimates based on the combustion conditions and the combustion characteristic values.

According to the present embodiment, the parameters of plural types correlative to the combustion conditions include at least one of the cylinder pressure, the cylinder temperature, the intake-gas oxygen concentration, or the injection pressure. In other words, the parameters include one or more of the cylinder pressure, the cylinder temperature, the intake-gas oxygen concentration, and the injection pressure. Since the parameters highly affect the combustion state, the microcomputer 80a can accurately estimate the mixing ratios by using the combustion characteristic values in the combustion where the combustion conditions differ.

According to the present embodiment, the combustion characteristic value is the ignition delay time TD from a time point that the fuel injection is instructed to a time point that the fuel is self-ignited. Since the ignition delay time TD is highly affected by the mixing ratios of various components, the microcomputer 80a can accurately estimate the mixing ratios based on the ignition delay time TD.

According to the present embodiment, the combustion characteristic acquisition portion 81 acquires the combustion characteristic value correlative to the combustion of the fuel injected before the main injection. In other words, the combustion characteristic acquisition portion 81 acquires the combustion characteristic value correlative to the combustion of the fuel injected in the pilot injection. Since the cylinder temperature becomes higher when the fuel in the main injection combusts, the fuel after the main injection becomes more easily to combust. In this case, the fuel after the main injection becomes more easily self-ignited. Thus, it is difficult that a variation of the combustion characteristic value is generated due to a difference in the mixing ratio of the fuel. Since the fuel injected before the main injection is not affected by a main combustion, it is likely that the variation of the combustion characteristic value is generated due to the difference in the mixing ratio of the fuel. An estimation accuracy of the mixing ratios can be improved by estimating the mixing ratios based on the combustion characteristic value.

(Second Embodiment)

According to a second embodiment of the present disclosure, a hardware configuration of the combustion system controller is as the same as the ECU 80 shown in FIG. 1. However, the combustion system controller according to the present embodiment includes an emission estimation portion, a combustion state estimation portion, an injection state estimation portion, and a combustion environment acquisition portion.

Figure 8:
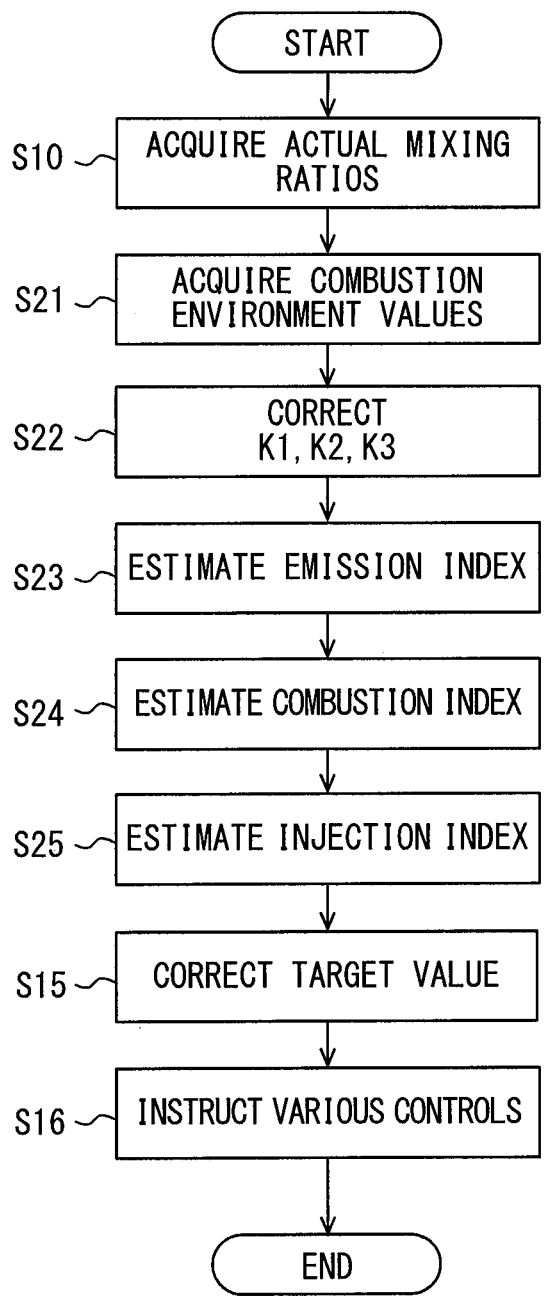
FIG. 8 is a flowchart showing the control flow of the operation of the combustion system which is executed by the combustion system controller, according to a second embodiment of the present disclosure.

FIG. 8 is a flowchart showing the control flow of the operation of the combustion system which is executed by the combustion system controller, according to the present embodiment. The combustion system controller executes the operation at a predetermined period, in the operation time period of the internal combustion engine 10. At S10 shown in FIG. 8, as the same as S10 shown in FIG. 7, the microcomputer 80a acquires the actual mixing ratios. At S21, the microcomputer 80a acquires combustion environment values that are physical amounts indicating a combustion environment in the combustion chamber 11a right before the combustion occurs.

The combustion environment values include the temperature in the combustion chamber 11a right before the combustion occurs. When the temperature in the combustion chamber 11a becomes higher, the combustion environment becomes an environment that the fuel is more easily ignited. For example, the temperature in the combustion chamber 11a at a time point that is a predetermined time period before the time point that the combustion starts (occurs), in an intake stroke and a compression stroke in a present combustion cycle, is equivalent to the combustion environment value. In this case, the combustion environment value that is the temperature is detected by the temperature detection element 21a.

The combustion environment values include a flow rate of the mixing gas in the combustion chamber 11a right before the combustion occurs. When the flow rate becomes faster, the combustion environment becomes an environment that the fuel is more easily ignited. For example, since the flow rate becomes faster when the engine speed at a time point that is a predetermined time period before the time point that the combustion starts (occurs) in the intake stroke and the compression stroke in the present combustion cycle becomes faster, the engine speed is equivalent to the combustion environment value. In this case, the combustion environment value that is the engine speed is detected by the crank angle sensor 24.

The combustion environment values include an oxygen concentration in the combustion chamber 11a. When the oxygen concentration becomes higher, the combustion environment becomes an environment that the fuel is more easily ignited. For example, the oxygen concentration at a time point that is a predetermined time period before the time point that the combustion starts (occurs), in the intake stroke in the present combustion cycle, is equivalent to the combustion environment value. In this case, the combustion environment value that is the oxygen concentration is detected by the oxygen concentration sensor 22.

At S22, the microcomputer 80a corrects constants K1, K2, and K3, based on the combustion environment values acquired at S21. At S23, the microcomputer 80a estimates a value of an emission index indicating an easiness level of a generation of a specified component included in the exhaust gas, based on the mixing ratios acquired at S10 and the constant K1 corrected at S22. In this case, the easiness level of the generation of the specified component is referred to as a generation level of the specified component. The emission index may be the smoke index indicating the generation level of the smoke, an HC index indicating a generation level of a non-combustion HC, a CO index indicating a generation level of a CO, or a NOx index indicating a generation level of a NOx.

At S24, the microcomputer 80a estimates a value of a combustion index that is an index indicating the combustion state in the internal combustion engine 10, based on the mixing ratios acquired at S10 and the constant K2 corrected at S22. The combustion index may be an index indicating an easiness of an increasing of a combustion amount, or an index indicating an easiness of a decreasing of the ignition delay time.

At S25, the microcomputer 80a estimates a value of an injection index that is an index indicating the injection state of the fuel injected into the combustion chamber 11a, based on the mixing ratios acquired at S10 and the constant K3 corrected at S22. The injection index may be a penetration force index indicating an easiness of an increasing of a penetration force of the fuel injected from the fuel injector 15, or a particle diameter index indicating an easiness of a decreasing of a particle diameter of the fuel constituting a spray. The injection index also may be a spray-length index indicating an easiness of an increasing of the spray of the fuel in an injection direction, or a spray-width index indicating an easiness of an increasing of the spray of the fuel in a direction perpendicular to the injection direction. In this case, the direction perpendicular to the injection direction is referred to as a spray-width direction.

The microcomputer 80a executing S23 is equivalent to the emission estimation portion, the microcomputer 80a executing S24 is equivalent to the combustion state estimation portion, and the microcomputer 80a executing S25 is equivalent to the injection state estimation portion. The microcomputer 80a calculates the value of the emission index, the value of the combustion index, the value of the injection index, and a value of a noise index that indicates an easiness of an increasing of a combustion noise, by substituting the mixing ratios for those in an equation shown in FIG. 9.

Figure 9:
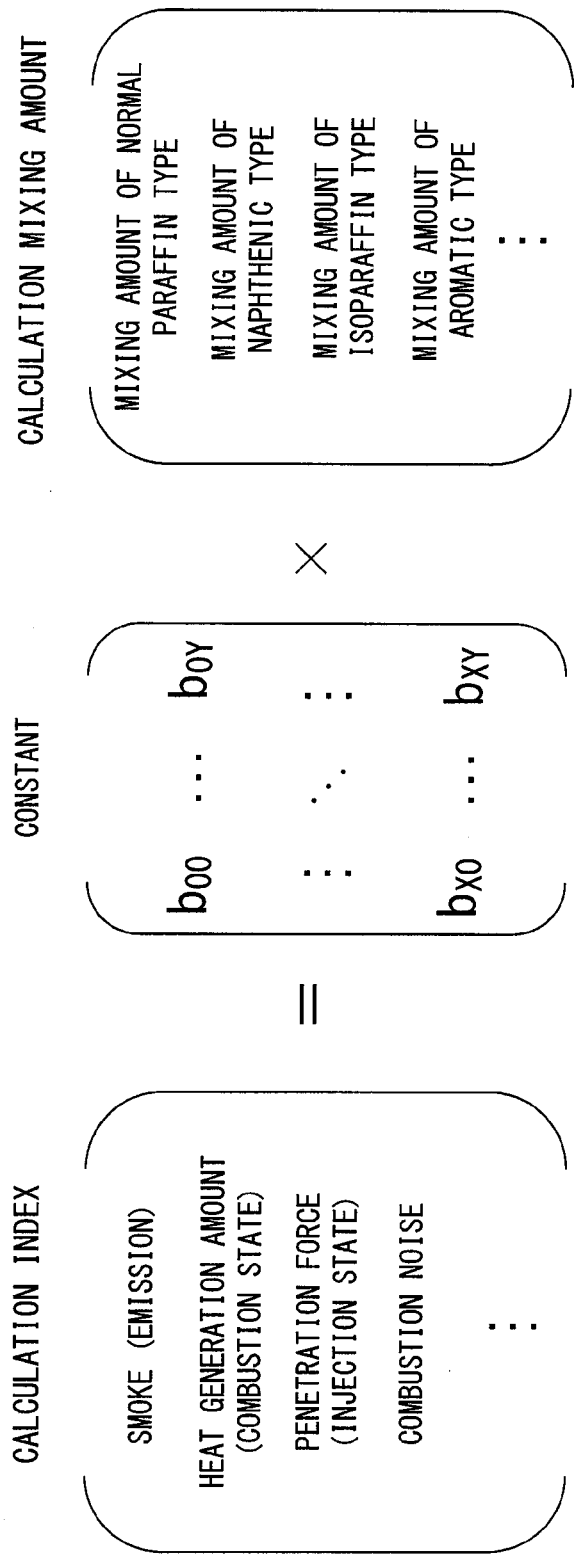
FIG. 9 is a diagram showing a relationship between an emission, a combustion state, an injection state, and the mixing amounts of various components.

As shown in FIG. 9, a calculation index is constituted by values arranged in a matrix including x+1 rows and 1 column. The values indicate the emission index, the combustion index, the injection index, and the noise index. A shown in FIG. 9, a calculation mixing amount is constituted by values arranged in a matrix including y+1 rows and 1 column. The values indicate the mixing amounts of the various components. The various components are components divided by types of a molecular structure. The types of the molecular structure include a normal paraffin type, an isoparaffin type, a naphthenic type, and an aromatic type.

As shown in FIG. 9, a constant is constituted by values arranged in a matrix including x+1 rows and y+1 columns. The values are values that are established based on a pretest and then corrected at S22 based on the combustion environment values. In the matrix, the value correlative to the emission index such as the smoke index is equivalent to the constant K1 used at S23. In the matrix, the value correlative to the combustion index such as the heat generation amount is equivalent to the constant K2 used at S24. In the matrix, the value correlative to the injection index such as the penetration force is equivalent to the constant K3 used at S25.

Next, referring to FIG. 9, a calculation of the emission index, the combustion index, the injection index, and the noise index will be described.

The various components include a component highly affecting the emission index and a component hardly affecting the emission index. Further, in the emission index, a component highly affecting the emission index differs according to types of the smoke index, the HC index, the CO index, and the NOx index. Similarly, regarding the combustion index, the injection index, and the noise index, a component highly affecting a corresponding index differs. As the above description, referring to FIG. 9, the constant is established to have a matrix. Therefore, the microcomputer 80a calculates the values of various indexes by multiplying the matrix indicating various mixing amounts by the matrix indicating the constant. Since the various indexes differ depending on variations of the combustion environment values in a case where the mixing ratios of the fuel are the same, the values in the matrix of the constant are corrected at S22 based on the combustion environment values.

According to the present embodiment, the combustion system controller includes the emission estimation portion that estimates the generation level of the specified component included in the exhaust gas of the internal combustion engine 10 based on the mixing ratios. Specifically, the microcomputer 80a calculates the value of the emission index at S23. Then, the microcomputer 80a (the control portion) controls the fuel injector 15 at least based on the estimation result of the emission estimation portion so as to control the operation of the combustion system. Thus, since the microcomputer 80a estimates the emission index based on the mixing ratios, the microcomputer 80a can accurately estimate the emission index. In other words, the microcomputer 80a can accurately execute an emission index estimation. Since the microcomputer 80a controls the operation of the combustion system based on the estimation result of the emission estimation portion, it can be accurately achieved that the emission state is controlled in the required state. In particular, since it is highly difficult that the emission index is estimated only based on a detection result of the cylinder pressure sensor 21, the microcomputer 80a can accurately execute the emission index estimation according to the present embodiment.

According to the present embodiment, the combustion system controller includes the combustion state estimation portion that estimates the combustion state of the fuel in the internal combustion engine 10 based on the mixing ratios. Specifically, the microcomputer 80a calculates the value of the combustion index at S24. Then, the microcomputer 80a (the control portion) controls the fuel injector 15 at least based on the estimation result of the combustion state estimation portion so as to control the operation of the combustion system. Thus, since the microcomputer 80a estimates the combustion index based on the mixing ratios, the microcomputer 80a can accurately estimate the combustion index. In other words, the microcomputer 80a can accurately execute a combustion index estimation. Since the microcomputer 80a controls the operation of the combustion system based on the estimation result of the combustion state estimation portion, it can be accurately achieved that the combustion state is controlled in the required state. In particular, since an accuracy of an estimation of the combustion index is remarkably low in a case where the combustion index is estimated only based on the detection result of the cylinder pressure sensor 21, the microcomputer 80a can accurately execute the combustion index estimation according to the present embodiment.

According to the present embodiment, the combustion system controller includes the injection state estimation portion that estimates the injection state of the fuel injected into the combustion chamber 11a based on the mixing ratios. Specifically, the microcomputer 80a calculates the value of the injection index at S25. Then, the microcomputer 80a (the control portion) controls the fuel injector 15 at least based on the estimation result of the injection state estimation portion so as to control the operation of the combustion system. Thus, since the microcomputer 80a estimates the injection index based on the mixing ratios, the microcomputer 80a can accurately estimate the injection index. In other words, the microcomputer 80a can accurately execute an injection index estimation. Since the microcomputer 80a controls the operation of the combustion system based on the estimation result of the injection state estimation portion, it can be accurately achieved that the injection state is controlled in the required state.

According to the present embodiment, the combustion system controller includes the combustion environment acquisition portion that acquires (estimates) at least one of the temperature in the combustion chamber 11a, the flow rate of the mixing gas in the combustion chamber 11a, or the oxygen concentration in the combustion chamber 11a, in the combustion environment before the combustion of the fuel occurs in the combustion chamber 11a. In other words, the combustion system controller includes the combustion environment acquisition portion that acquires (estimates) one or more of the temperature in the combustion chamber 11a, the flow rate of the mixing gas in the combustion chamber 11a, and the oxygen concentration in the combustion chamber 11a, in the combustion environment before the combustion of the fuel occurs in the combustion chamber 11a. Specifically, the microcomputer 80a acquires the combustion environment values at S21. Then, the microcomputer 80a controls the operation of the combustion system based on the mixing ratios and the combustion environment values. For example, the microcomputer 80a corrects the constants K1, K2, and K3 based on the combustion environment values, and calculates the various indexes based on the mixing ratios. In other words, the microcomputer 80a calculates the various indexes by considering the combustion environment values. Thus, an accuracy of controlling the combustion system in the required state can be improved.

(Other Embodiment)

The present disclosure is not limited to the embodiments mentioned above, and can be applied to various embodiments as followings. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

According to the above embodiments, as shown in FIG. 1, the mixing ratio estimation portion 82 estimates the mixing ratios of the various components based on plural combustion characteristic values. However, the combustion system controller may detect general characteristics of the fuel by using a sensor or plural sensors, and may estimate the mixing ratios based on a detection result of the sensor or a detection result of the plural sensors. The general characteristics may include a density of the fuel, a kinematic viscosity of the fuel, and a distillation temperature of the fuel.

According to the second embodiment, as shown in FIG. 9, the combustion system controller calculates index values based on the mixing amount of the various components, and controls the fuel injector 15 by using the control portion based on the index values so as to control the operation of the combustion system For example, the combustion system controller may calculate the index values based on the mixing ratios, and correct the target values that are above described, based on the index values. However, the combustion system controller may cancel a calculation of the index values, and may control the operation of the combustion system based on the mixing amounts of the various components. For example, the combustion system controller may correct the target values based on the mixing ratios.

According to the second embodiment, as shown in FIG. 9, the combustion system controller estimates the indexes including the emission index, the combustion index, the injection index, and the noise index, based on the mixing ratios. However, the combustion system controller may estimate at least one type of the above indexes, based on the mixing ratios. Alternatively, the combustion system controller may estimate plural indexes for the above types of the above indexes, or may estimate one index for each of the above type of the above indexes. For example, the combustion system controller may estimate at least one of the smoke index, the HC index, the CO index, or the NOx index, for the emission index. In other words, the combustion system controller may estimate one or more of the smoke index, the HC index, the CO index, and the NOx index.

According to the second embodiment, as shown in FIG. 8, the combustion system controller corrects the values constituting the matrix of the constant, based on the combustion environment values, at S22. However, the above correction may be cancelled.

According to the above embodiments, as shown in FIG. 2, a time period from the time point t1 that the energization starts to the time point t3 that the combustion starts is defined as the ignition delay time TD. However, a time period from the time point t2 that the injection is started to the time point t3 that the combustion starts may be defined as the ignition delay time TD. The combustion system controller may detect a time point that a variation is generated in the fuel pressure including the common rail pressure when the injection is started and estimate the time point t2 that the injection is started based on the above detection time point.

As shown in FIG. 1, the combustion characteristic acquisition portion 81 acquires the ignition delay time TD as the detection value of the physical amount relating to the combustion. In this case, the detection value of the physical amount relating to the combustion is equivalent to the combustion characteristic value. However, the combustion system controller may acquire a waveform indicating a variation of the heat generation rate or acquire the heat generation amount that is an amount of the heat generated in the combustion of the fuel, as the combustion characteristic value. Further, the combustion system controller may estimate the mixing ratios of the various components based on plural types of the combustion characteristic values such as the ignition delay time TD, the waveform of the heat generation rate, and the heat generation amount. For example, the values of the constant shown in FIG. 3 may be set to values correlative to the plural types of the combustion characteristic values, and the combustion system controller may estimate the mixing ratios by substituting the plural types of the combustion characteristic values for the combustion parameters shown in FIG. 3.

As shown in FIG. 3, the combustion conditions are set such that all of the ignition delay times TD are different from each other. In other words, in combustion conditions i, j, k, and l which are specified combinations of the parameters, the cylinder pressures are all set to different values P(i), P(j), P(k), and P(l), respectively. Similarly, the cylinder temperatures T, the intake-gas oxygen concentrations $O_2$, and the injection pressures Pc are also set to different values. However, the combustion system controller may set as least one of the parameters to be different from other parameters, for the different combustion conditions. For example, in the combustion conditions i and j, the combustion system controller may set the cylinder temperatures T, the intake-gas oxygen concentrations $O_2$, and the injection pressures Pc to be the same values, respectively, and set the cylinder pressures to be P(i) and P(j) which are different from each other.

As shown in FIG. 3, the combustion system controller sets plural combustion conditions specified by combinations of plural types of the parameters and acquires the combustion characteristic values of when the fuel combusts in the plural combustion conditions. However, the combustion controller may set one type of the parameters and acquire the combustion characteristic values of when the fuel combusts in the combustion condition where the value of the parameter differs. Alternatively, the combustion controller may change an injection time point to a time point (crank angle) that the cylinder temperature becomes a request value and positively acquire the combustion characteristic value in the combustion condition that is required. Alternatively, since it is possible that the main combustion varies, the combustion system controller may limit a change of the injection time point to one cylinder or add an extra injection that is used to detect the combustion characteristic value and is different from the pilot injection.

It is preferable that the injection time point is changed in one or more specified cylinders without changing the injection time point in all the cylinders. It is preferable that the change of the injection time point is prohibited in the main injection. Further, it is preferable that the change of the injection time point is prohibited in the pilot injection that highly affects the main injection. Furthermore, an exclusive injection that is used to detect the combustion characteristic value may be added, and the combustion system controller may acquire the combustion characteristic value of when the fuel combusts in the exclusive injection in the required state.

According to the above embodiments, the combustion system controller acquires the combustion characteristic value correlative to the combustion of the fuel injected right before the main injection. In other words, the combustion system controller acquires the combustion characteristic value correlative to the combustion of the fuel injected in the pilot injection. However, the combustion system controller may acquire the combustion characteristic value correlative to the combustion of the fuel injected after the main injection. Specifically, the combustion system controller may acquire the combustion characteristic value correlative to the combustion of the fuel injected in an after injection or a post injection. Moreover, when a multiple injection where the fuel is injected for plural times is executed before the main injection, a first injection of the multiple injection hardly affects the main injection. Therefore, it is preferable that the combustion system controller acquires the combustion characteristic value correlative to the combustion of the fuel injected in the first injection.

According to the above embodiments, the combustion system controller acquires the combustion characteristic value based on the detection value of the cylinder pressure sensor 21. However, in a configuration that the cylinder pressure sensor 21 is not provided, the combustion system controller may estimate the combustion characteristic value based on a rotation variation of a rotation angle sensor. In this case, the rotation variation is a differential value. For example, the combustion system controller may estimate a time point that the differential value exceeds a predetermined threshold due to a pilot combustion as a pilot ignition time point. The combustion system controller can estimate a pilot combustion amount based on a magnitude of the differential value.

According to the first embodiment, as shown in FIG. 1, the cylinder temperature is detected by the temperature detection element 21a. However, the cylinder temperature may be estimated based on the cylinder pressure detected by the cylinder pressure sensor 21. Specifically, the cylinder temperature may be estimated by a calculation of the cylinder pressure, a cylinder capacity, a weight of a gas in the cylinder, and a gas constant.

The ECU 80 that is the combustion system controller has functions which can be achieved by a computer that executes a software stored in a memory that is substantial, a software, a hardware, or a combination of the above. For example, when the combustion system controller is constituted by a circuit that is a hardware, the circuit may include a digital circuit including plural logic circuit or may include an analog circuit.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A combustion system controller controlling an operation of a combustion system including an internal combustion engine, comprising:
    a mixing ratio acquisition portion acquiring mixing ratios of various components included in a fuel; and
    a control portion controlling the operation of the combustion system based on the mixing ratios acquired by the mixing ratio acquisition portion;
    an emission estimation portion estimating a generation level of a specified component included in an exhaust gas of the internal combustion engine, based on the mixing ratios, wherein
    the control portion controls the operation of the combustion system, at least based on an estimation result of the emission estimation portion.

2. The combustion system controller according to claim 1, wherein
    the component that is an estimation object of the mixing ratio is a component that is divided by types of a molecular structure.

3. The combustion system controller according to claim 2, wherein
    the types of the molecular structure include at least one of a normal paraffin type, an isoparaffin type, a naphthenic type, or an aromatic type.

4. The combustion system controller according to claim 1, further comprising:
    a combustion environment acquisition portion acquiring at least one of a temperature in a combustion chamber of the internal combustion engine, a flow rate of a mixing gas in the combustion chamber, or an oxygen concentration in the combustion chamber, in a combustion environment before a combustion of the fuel occurs in the combustion chamber, wherein
    the control portion controls the operation of the combustion system, based on the mixing ratios and an estimation result of the combustion environment acquisition portion.

5. The combustion system controller according to claim 1, further comprising:
   a combustion state estimation portion estimating a combustion state of the fuel in the internal combustion engine, based on the mixing ratios, wherein
   the control portion controls the operation of the combustion system, at least based on an estimation result of the combustion state estimation portion.

6. The combustion system controller according to claim 1, further comprising:
   an injection state estimation portion estimating an injection state of the fuel injected into a combustion chamber of the internal combustion engine, based on the mixing ratios, wherein
   the control portion controls the operation of the combustion system, at least based on an estimation result of the injection state estimation portion.

7. A combustion system controller controlling an operation of a combustion system including an internal combustion engine, comprising:
   a mixing ratio acquisition portion acquiring mixing ratios of various components included in a fuel;
   a control portion controlling the operation of the combustion system based on the mixing ratios acquired by the mixing ratio acquistion portion; and
   a combustion state estimation portion estimating a combustion state of the fuel in the internal combustion engine, based on the mixing ratios, wherein
   the control portion controls the operation of the combustion system, at least based on an estimation result of the combustion state estimation portion.

8. A combustion system controller controlling an operation of a combustion system including an internal combustion engine, comprising:
   a mixing ratio acquisition portion acquiring mixing ratios of various components included in a fuel;
   a control portion controlling the operation of the combustion system based on the mixing ratios acquired by the mixing ratio acquisition portion; and
   an injection state estimation portion estimating an injection state of the fuel injected into a combustion chamber of the internal combustion engine, based on the mixing ratios, wherein
   the control portion controls the operation of the combustion system, at least based on an estimation result of the injection state estimation portion.

* * * * *